(12) United States Patent
Just

(10) Patent No.: US 9,940,620 B2
(45) Date of Patent: Apr. 10, 2018

(54) SYSTEMS AND METHODS FOR PROCESSING CUSTOMER PURCHASE TRANSACTIONS USING BIOMETRIC DATA

(71) Applicant: Richard Just, Berkeley, CA (US)

(72) Inventor: Richard Just, Berkeley, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 14/137,143

(22) Filed: Dec. 20, 2013

(65) Prior Publication Data

US 2014/0201080 A1 Jul. 17, 2014

Related U.S. Application Data

(60) Provisional application No. 61/752,266, filed on Jan. 14, 2013.

(51) Int. Cl.
*G06Q 20/40* (2012.01)
*G06Q 30/06* (2012.01)
(Continued)

(52) U.S. Cl.
CPC ... *G06Q 20/40145* (2013.01); *G06Q 30/0601* (2013.01)

(58) Field of Classification Search
CPC .............................. G06F 17/60; G06Q 40/00
See application file for complete search history.

(56) References Cited

U.S. PATENT DOCUMENTS 6,507,279 B2 * 1/2003 Loof ...................... G06Q 20/20
                                                                   235/375
7,614,550 B1 * 11/2009 Robinson ............... G06Q 20/04
                                                                  235/379

(Continued)

OTHER PUBLICATIONS

Newton, Elaine. Security and Privacy Challenges of Biometric Authentication for Online Transactions. NIST, Information Technology Laboratory, Computer Security Division. Downloaded on Nov. 13, 2017.*

(Continued)

*Primary Examiner* — Muriel Tinkler
(74) *Attorney, Agent, or Firm* — Finnegan, Henderson, Farabow, Garrett & Dunner, L.L.P.

(57) ABSTRACT

A system and method is provided for processing customer purchase transactions using biometric data. Consistent with disclosed embodiments, a processing entity receives biometric data of a customer, wherein the biometric data is unique to the customer. The processing entity may additionally receive transaction data, the transaction data reflecting the price of a purchase transaction by the customer. The processing entity may compare the received biometric data to stored biometric data associated with customers of a financial service provider and identify common biometric data. Additionally, the processing entity may correlate the common biometric data to a customer account associated with the financial service provider, compare the customer account associated with the financial service provider with the transaction data, and verify the customer account associated with the financial service provider contains adequate funds. Furthermore, the processing entity may authorize the purchase transaction.

19 Claims, 10 Drawing Sheets

(51) Int. Cl.
    *G06F 15/177*    (2006.01)
    *G06F 21/00*    (2013.01)
    *G06F 21/20*    (2006.01)

(56) References Cited

U.S. PATENT DOCUMENTS

| | | | | |
|---|---|---|---|---|
| 2004/0245330 | A1* | 12/2004 | Swift | G06Q 20/04 235/379 |
| 2005/0192895 | A1* | 9/2005 | Rogers | G06Q 20/023 705/39 |
| 2011/0209200 | A2* | 8/2011 | White | G06F 21/32 726/4 |
| 2013/0133049 | A1* | 5/2013 | Peirce | G06K 9/00926 726/6 |
| 2013/0160100 | A1* | 6/2013 | Langley | H04L 63/126 726/7 |
| 2014/0032723 | A1* | 1/2014 | Nema | G06Q 10/00 709/220 |

OTHER PUBLICATIONS

Jain, Anil. An Introduction to Biometric Recognition. Appeared in IEEE Transactions on Circuits and Systems for Video Technology, Special Issue on Image-and Video-Based Biometrics, vol. 14, No. 1, Jan. 2004.*

Ratha et al. Enhancing Security and Privacy in Biometrics-based Authentication Systems. IBM Systems Journal; Armonk vol. 40, Iss. 3 (2001):614-634.*

* cited by examiner

SYSTEMS AND METHODS FOR PROCESSING CUSTOMER PURCHASE TRANSACTIONS USING BIOMETRIC DATA

CROSS REFERENCE TO RELATED APPLICATION

This application claims priority under 35 U.S.C. § 119 to U.S. Provisional Application No. 61/752,266, filed on Jan. 14, 2013, which is expressly incorporated herein by reference in its entirely.

FIELD

The disclosed embodiments generally relate to processing consumer transactions and, more specifically, processing consumer transactions based on biometric data.

BACKGROUND

A biometric identifier is a unique physical or behavioral characteristic that can be used as a means of verifying personal identity such as, for example, a fingerprint or an iris scan. Suitable biometric identifiers for personal identification are typically universal, unique, permanent, and measurable. A system relying on biometrics can require a user to provide a single biometric identifier or multiple biometric identifiers, improving the accuracy of the identification.

Biometrics may be used as a form of personal identification associated with financial transactions. Convenience and security are advantages of biometric identifiers in such applications. Biometric identification, however, can be spoofed.

Accordingly, there is a need to provide robust, reliable, and secure methods and systems for processing customer purchase transactions using biometric identifiers.

SUMMARY

Consistent with disclosed embodiments, systems and methods are provided for using biometric data to processes a customer purchase transaction. For example, disclosed embodiments may allow a customer to reveal one or more unique and measurable biometric characteristics of that customer when making a purchase transaction in place of using a credit/debit card or cash. In some embodiments, instead of swiping a credit card when making a transaction, a customer may be asked to provide one or more pieces of biometric data (e.g., fingerprint, eye scan). The sale transaction may be complete once the information is provided and confirmed. In some disclosed embodiments, the customer may no longer be required to carry credit/debit cards or cash in order to make a purchase at a merchant.

Although disclosed embodiments are discussed primarily in the context of processing customer purchase transactions, other applications are contemplated. For example, disclosed embodiments may allow for protection against fraudulent transactions.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate disclosed embodiments and, together with the description, serve to explain the disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
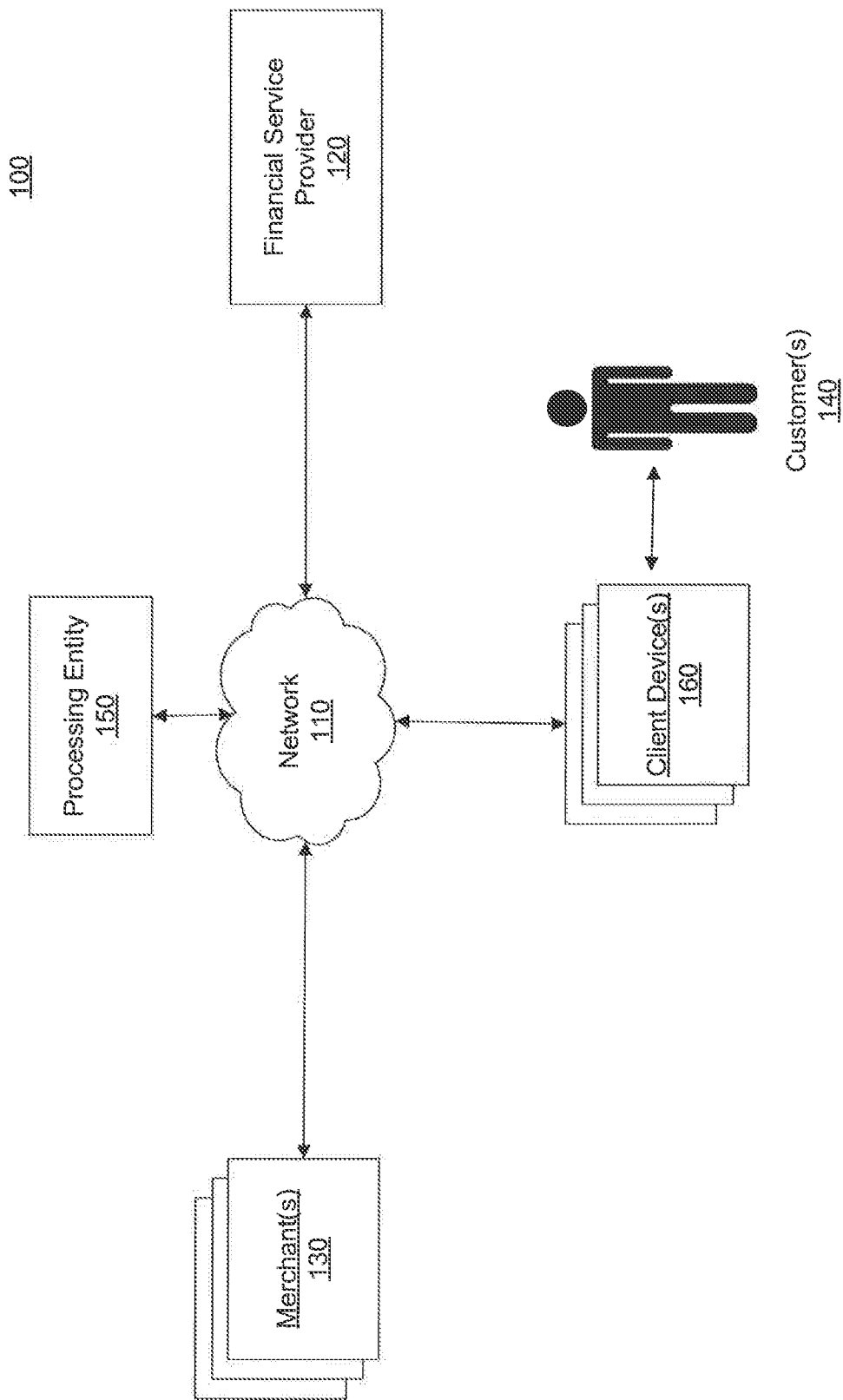
FIG. 1 illustrates an exemplary system for processing a customer purchase transaction using biometric data consistent with disclosed embodiments.

FIG. 1 is a diagram illustrating an exemplary system 100 for processing purchase transactions using biometric data. The components and arrangement of the components described in FIG. 1 may vary. Furthermore, system 100 may additionally include any other entity or source of information associated with a purchase transaction. System 100 may include a network 110, financial service provider 120, merchant(s) 130, customer(s) 140, and processing entity 150.

Network 110 may be any type of network configured to provide communications between components of FIG. 1. For example, network 100 may be any type of network (including infrastructure) that provides communications, exchanges information, and/or facilitates the exchange of information, such as the Internet, a Local Area Network, or other suitable connection(s) that enables system 100 to send and receive information between the components of system 100.

Financial service provider 120 may be a system that is associated with a financial service provider that provides and/or manages financial service accounts, such as a bank, credit card company, brokerage firm, etc. In some embodiments, financial service provider 120 may include one or more computing systems that are located at a central location or may include computing devices that are distributed (locally or remotely).

A financial service provider associated with financial service provider 120 may provide different financial service products for customers. In some aspects, the financial service provider may provide and/or manage a customers financial service account. Financial service accounts may include, for example, credit card accounts, checking accounts, savings accounts, loans, investment accounts, and the like. The financial service provider may employ one or more computing systems, including financial service provider 120, to execute instructions that monitor customer purchasing transactions associated with the financial service accounts.

Merchant 130 may be a system that is associated with one or more entities that sells products and/or services to customers 140. For example, the merchant may include a physical location (brick and mortar location) and/or may sell the products/services using known e-commerce mechanisms, such as over the Internet. For instance, the merchant may include department stores, retail shops, grocery stores, pharmacy stores, and specialty stores. The merchant may use one or more computing systems, including merchant 130, to provide and manage one or more websites or mobile applications that sell products and/or services.

Processing entity 150 may be a system that is associated with one or more entities associated with financial service provider 120. Specifically, processing entity 150 may provide infrastructure to financial service providers in issuing and processing purchase transactions and/or financial service accounts associated with financial service provider 120. For example, processing entity 150 may include a data repository 256 (see FIG. 2) that maintains customer information and customer purchase transaction information for each customer associated with financial service provider 120. In some embodiments, processing entity may be an integrated component of one or more components of system 100, including financial service provider 120.

Figure 2:
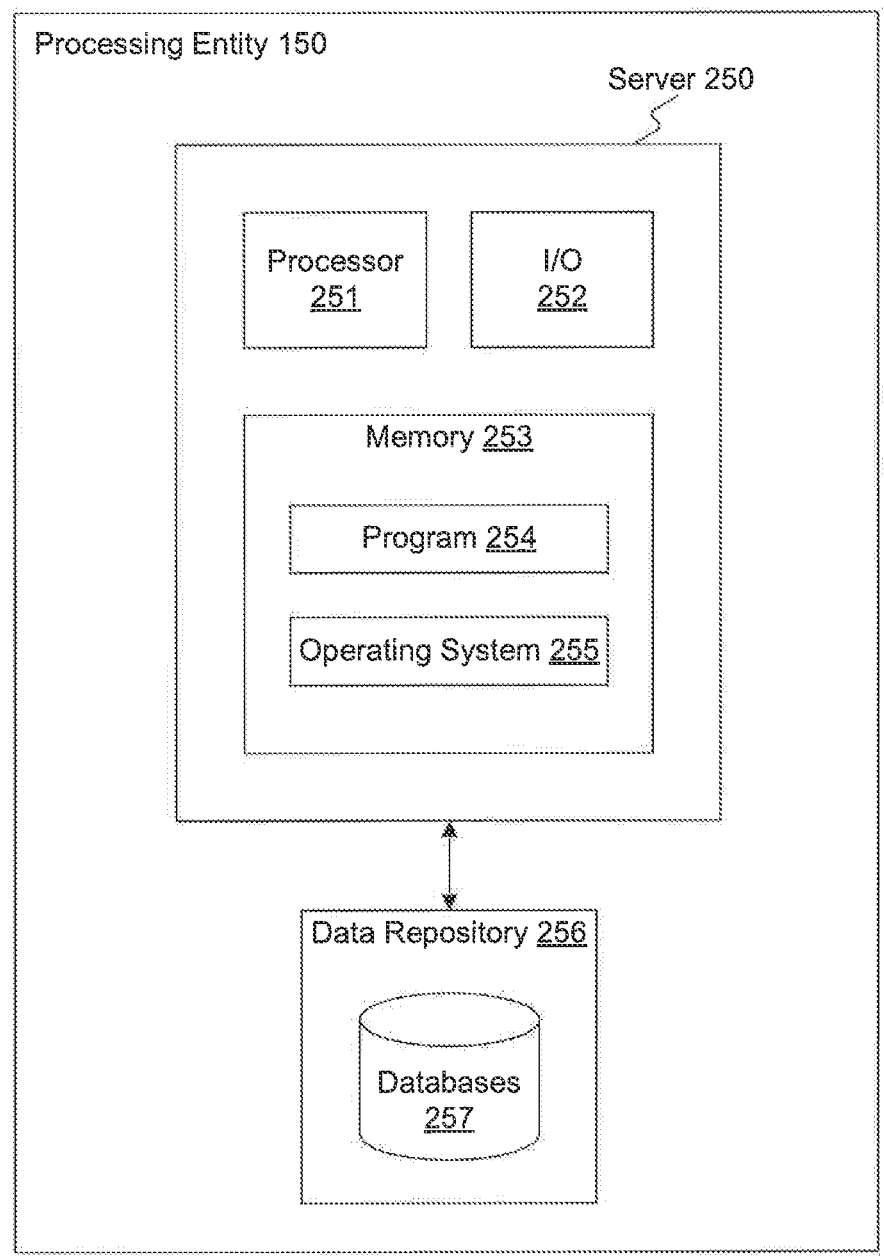
FIG. 2 illustrates another exemplary system for processing a customer purchase transaction using biometric data consistent with disclosed embodiments.

In some embodiments, processing entity 150 or other components of system 100 may include one or more processor(s) and memory device(s) that enable software instructions to be executed to perform operations consistent with disclosed embodiments. In one example, processing entity 150 may include a server that is configured to execute software instructions stored in one or more memory devices to perform one or more operations consistent with the disclosed embodiments. FIG. 2 shows an exemplary system that may be associated with processing entity 150. In some embodiments, the system includes a server 250 having one or more processors 251, one or more memories 253, and one or more input/output (I/O) devices 252. Server 250 may take the form of a general purpose computer, a mainframe computer, or any combination of these components. Server 250 may be standalone, or it may be part of a subsystem, which may be part of a larger system.

Customer 140 may include one or more customers associated with financial service accounts of financial service provider 120. Customer 140 may possess several biometric characteristic genetically unique to each customer. Customer 140 may communicate with other components of system 100 using any suitable computer device, such as client device 160.

Figure 3:
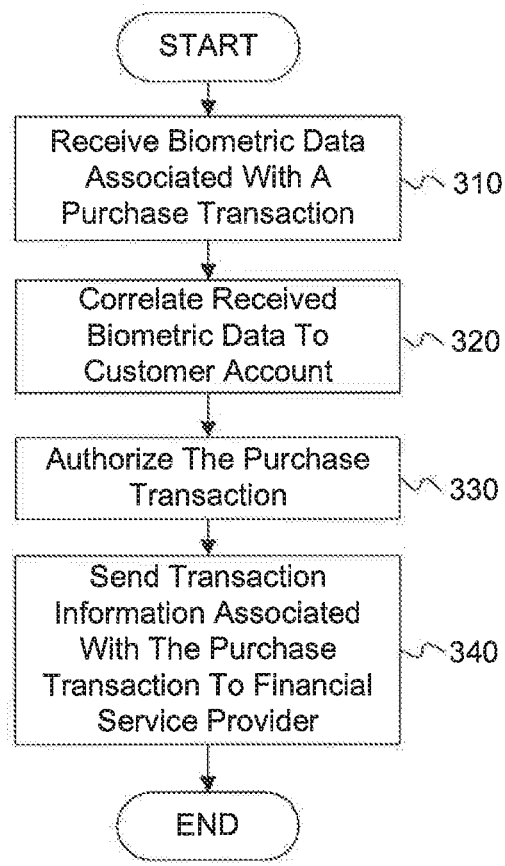
FIG. 3 depicts a flowchart of an exemplary method for processing a customer purchase transaction using biometric data consistent with disclosed embodiments.

FIG. 3 is a flow diagram 300 of an exemplary method for processing a customer purchase transaction using biometric data, consistent with disclosed embodiments. In step 310, processing entity 150 may receive biometric data associated with a purchase transaction. The biometric data may be received, for example, from merchant 130 with a request to process a purchase transaction. In other embodiments, processing entity 150 may received the biometric data from another source and/or entity (for example, directly from customer 140 through client device 160). The biometric data may reflect measurable characteristics unique to each person that remain constant over time. A more detailed discussion is provided below regarding the receiving biometric data (with respect to FIG. 4).

Server 250 may also correlate the received biometric data to a customer account (step 320). The customer account may include a financial service account of customer 140 associated with financial service provider 120. As a non-limiting example, server 250 may compare the received biometric data with stored biometric data to identify a customer account associated with the stored biometric data. According to some embodiments, server 250 may have previously received the stored biometric data from customers associated with financial service provider 120. In other embodiments, server 250 may request biometric data for a particular customer from another component of system 100 based on other data associated with the purchase transaction. In still other embodiments, customer 140 may later provide server 250 with biometric samples for subsequent confirmation/correlation. A more detailed discussion is provided below regarding the correlating of biometric data to a customer account (see FIG. 5).

In some aspects, server 250 may authorize the purchase transaction based on the correlation of biometric data to a financial service account of customer 140 (step 330). For example, server 250 may compare transaction data with the customer account associated with financial service provider 120 and verify the customer account contains adequate funds to complete the transaction. Additionally, server 250 may verify the purchase transaction is not fraudulent based on the received biometric data. A more detailed discussion is provided below regarding authorizing the purchase transaction (see FIG. 6).

Server 250, in step 340, may send transaction information associated with the purchase transaction to financial service provider 120. Specifically, server 250 may send customer account information, transaction data, and authorization information to financial service provider 120. Financial service provider 120 may use the received transaction information in order to, for example, update customer account balances or provide additional fraud detection. A more detailed discussion is provided below regarding sending transaction information to financial service provider 120 (see FIG. 7).

Figure 4:
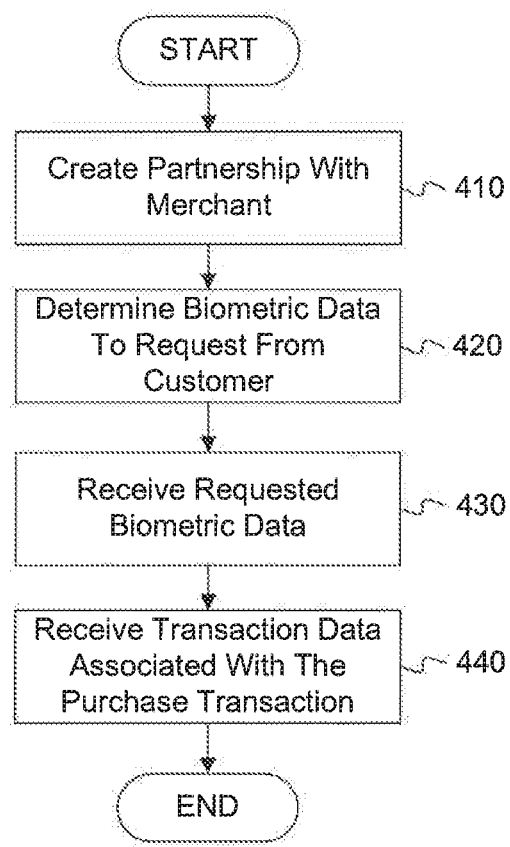
FIG. 4 depicts a flowchart of an exemplary method for receiving biometric data associated with a purchase transaction consistent with disclosed embodiments.

FIG. 4 depicts a flowchart of an exemplary method for receiving biometric data associated with a purchase transaction consistent with disclosed embodiments. As shown in FIG. 4, processing entity 150 may create a partnership with merchant 150. For example, the two entities may agree to allow customer 140 to purchase service/products from merchant 130 through processing entity 150 (step 410). In some embodiments, server 250 may receive an authorization from financial service provider to process purchase transactions associated with customer 140. For instance, processing entity 150 may provide payment options or terminals to merchant 150 that allows customer 140 to request purchase transactions. The payment terminals may be accessible to customer 140 at a physical location or through internet 110. For example, customer 140 may access the payment terminals through the internet using client device 160.

Server 250 may also determine which biometric data to request from customer 140 when making a purchase transaction (step 420). The biometric data may include data regarding customer characteristics identified from voice recognition, iris eye scan, fingerprint, palm print, walking gait, facial recognition, DNA swab, or the like. Server 250 may request one or more biometric data characteristics for use in processing purchase transactions. For example, server 250 may select three characteristics to request from each customer 140 when making a purchase transaction. The characteristics may be randomly selected before or during the purchase transaction to prevent fraudulent transactions. In other embodiments, financial service provider 120, customer 140, or any other component of system 100 may select which characteristics to provide server 250.

Additionally or alternatively, server 250 may require customer 140 to perform one or more actions associated with biometric data when making a purchase transaction. For example, server 250 may require customer 140 to smile, look up or down, look to the left or right, raise eyebrows, etc when providing the selected biometric data. In some embodiments, server 250 may require customer 140 to say a particular phrase, provide a fingerprint of a specific finger or set of fingers, and/or roll their fingers in a particular way. Such actions may also be determined randomly for each purchase transaction to prevent fraudulent transactions. Alternatively, the actions may be similar to previous requests from server 250, for example requests when customer 140 initially obtained the financial service account and provided the biometric information.

In step 430, server 250 may receive the requested biometric data associated with a purchase transaction. For example, server 250 may include devices capable of receiving and analyzing a customer's voice, iris eye scan, fingerprint, palm print, walking gait, facial recognition, DNA swab, or any other biometric data capable of being associated with customer 140. In exemplary embodiments, a payment terminal associated with processing entity 150 may be capable of receiving and/or analyzing the biometric data. For example, server 250 may be communicatively associated with a payment terminal having a video device capable of scanning an iris and/or capturing a voice recording of customer 140. Server 250 may further process this biometric data to determine recognizable features unique to that customer (e.g., iris pattern, syllable pronunciation, etc.).

Furthermore, server 250 may receive transaction data associated with the purchase transaction by customer 140 (step 440). The transaction data may include, for example, the purchase price, time and data of the transaction, product/service identification (e.g., SKU number), and merchant identification (e.g., merchant identification number). Server 250 may receive the transaction data substantially simultaneously as server 250 receives the biometric data. In other embodiments, server 250 may receive the transaction data and biometric data separately, by different means, and/or at different times.

Figure 5:
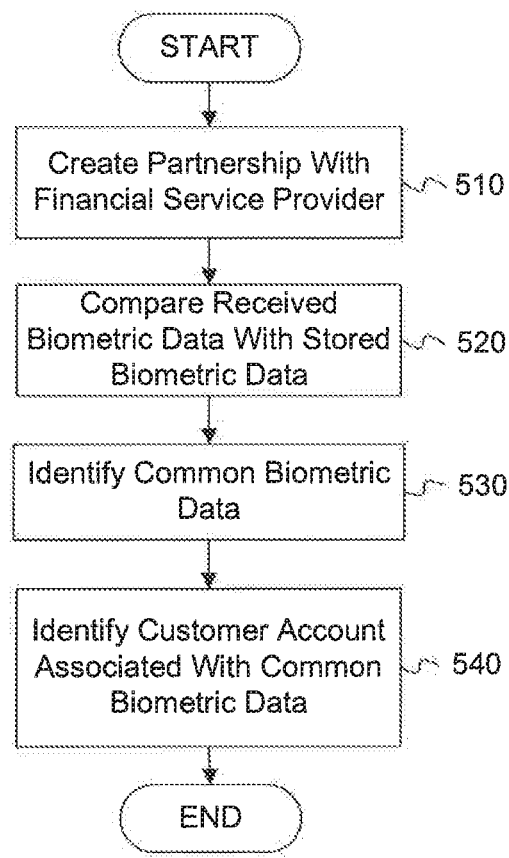
FIG. 5 depicts a flowchart of an exemplary method for correlating received biometric data to a customer account consistent with disclosed embodiments.

FIG. 5 depicts a flowchart of an exemplary method for correlating received biometric data to a customer account consistent with disclosed embodiments. In some aspects, server 250 may correlate the received biometric data to a customer account associated with customer 140 and financial service provider 120. For example, server 250 may receive an indication that financial service provider 140 and merchant 130 have formed a partnership (step 510). In some embodiments, the two entities may agree to share customer transaction information for customers associated with financial service provider 120 and purchase transactions associated with merchant 130. For example, server 250 may share purchase transaction information with financial service provider 120 when customer 140, associated with financial service provider 120, makes a purchase transaction at merchant 130.

Server 250 may compare the received biometric data from customer 140 with stored biometric data, as shown in step 520. The stored biometric data may represent previously received biometric data for customers of financial service provider 120. Such stored biometric data may include one or more of the biometric characteristics (e.g., voice recognition, iris eye scan, fingerprint, palm print, walking gait, facial recognition, DNA swab, and the like). Server 250 may compile the stored biometric data into searchable databases. The stored biometric data may be linked to one or more customer accounts associated with financial service provider 120.

Server 250 may compare the received biometric data and stored biometric data to identify common biometric data (step 530). For example, server 250 may search the stored biometric databases for biometric data considered substantially similar to the received biometric data to identify common biometric data. If server 250 received more than one piece of biometric data (e.g., an iris scan, voice recognition, and fingerprint), server 250 may begin the search by searching stored information for the first piece of biometric data (i.e., iris scan) until server 250 identifies common biometric data associated with the iris scan. Server 250 may initially determine which received biometric data is the most accurate and/or secure and begin the search with this data. Alternatively, server 250 may begin the search with received biometric data that is less accurate and/or secure to reduce the amount of data to be searched. Server 250 may continue the search using all or only a subset of the received biometric data. For example, a search of the additional biometric data may initially be confined to biometric data associated with the customer for which the iris scan is associated. Each search may be tailored accordingly to maximize efficiency.

Additionally or alternatively, server 250 may be configured to determine a confidence value related to the common biometric data. For example, server 250 may use the first piece of biometric data (i.e., iris scan) to identify common biometric data. Server 250 may assign a confidence value to this common biometric data. If the confidence value meets a predetermined threshold amount, server 250 may identify this common biometric data as the common biometric data used to identify a customer account. If the confidence value fails to meet the predetermined threshold amount, server 250 may additionally use the second piece of biometric data (i.e., voice recognition) to identify common biometric data. Server 250 may also assign this second piece of biometric data a confidence value. If the confidence values associated with the first and second pieces of biometric data together meet the predetermined threshold amount, server 250 may use both common biometric data to identify a customer account. If the predetermined threshold amount has not been met, server 250 may continue to use all the received biometric data until the cumulative common biometric data meets the predetermined threshold amount. If the predetermined threshold amount cannot be met, server 250 may determine that the purchase transaction should not be completed. In step 540, server 250 may identify a customer account associated with the biometric data determined to be in common with the stored biometric data. The customer account may represent a financial service account associated with financial service provider 120, for example, a credit card account, checking account, savings account, loan, investment account, or the like. Server 250 may link the common data to the customer account using an account number, customer social security number, and/or any other identifier.

Figure 6:
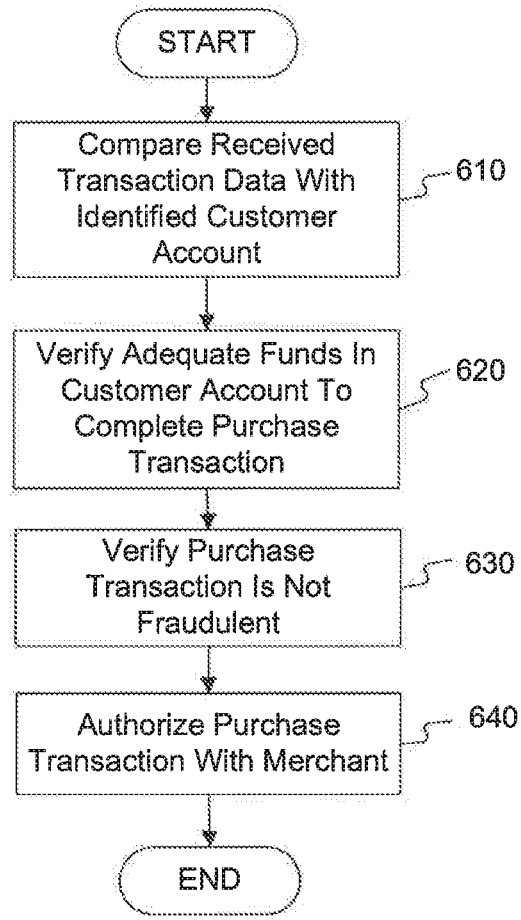
FIG. 6 depicts a flowchart of an exemplary method for authorizing the purchase transaction consistent with disclosed embodiments.

FIG. 6 depicts a flowchart of an exemplary method for authorizing the purchase transaction consistent with disclosed embodiments. As shown in FIG. 6, server 250 may authorize the purchase transaction based on the received transaction data and identified customer account. For example, server 250 may compare the purchase price indicated in the received purchase transaction data with the available funds associated the customer account (step 610). Thus, server 250 may verify the customer account contains adequate funds to complete the purchase transaction (step 620). In exemplary embodiments, server 250 may complete each verification substantially simultaneously with the completion of the purchase transaction. In other embodiments, server 250 may complete all verifications at the end of a day, week, month, etc.

It is further contemplated that server 250 may verify the transaction is not fraudulent, as shown in step 630. Server 250 may rate each biometric data characteristic according to its vulnerability to fraud. For example, server 250 may employ a numerical rating system to indicate vulnerability to fraud. In some embodiments, server 250 may rate fingerprint analysis as a 2, while facial recognition is rated a 3, with higher values indicating that the biometric data is less susceptible to fraud. Server 250 may then determine if the biometric data used to find common biometric data passes a predetermined threshold based on the rating. For example, server 250 may determine if the biometric data passes a threshold amount of 5, such that either fingerprint analysis or facial recognition alone would not pass the threshold but the two together would.

Additionally or alternatively, server 250 may rate each received biometric data according to how well server 250 is able to match the unique characteristics found in the biometric data. For example, server 250 may only be able to partially ascertain a first customer's fingerprint analysis due to a partial print or smearing. Server 250 may, however, be able to fully ascertain a second customer's fingerprint analysis. Server 250 may rate the second customer's fingerprint analysis as less susceptible to fraud than the first customer's, such that only the second customer's meets a predetermined threshold amount.

At step 640, server 250 may authorize the purchase transaction with merchant 130 and allow customer 140 to use the customer account to purchase the product/service. In exemplary embodiments, server 250 may only authorize purchase transactions where the biometric data passes one or more predetermined thresholds.

In other aspects, financial service provider 120 may include one or more devices capable of receiving the biometric data and comparing it to stored biometric data. Therefore, financial service provider 120 may identify common biometric data and link the common biometric data to a customer account associated with financial service provider 120. Financial service provider 120 may further verify the customer account contains adequate funds and authorize the transaction with merchant 130.

Figure 7:
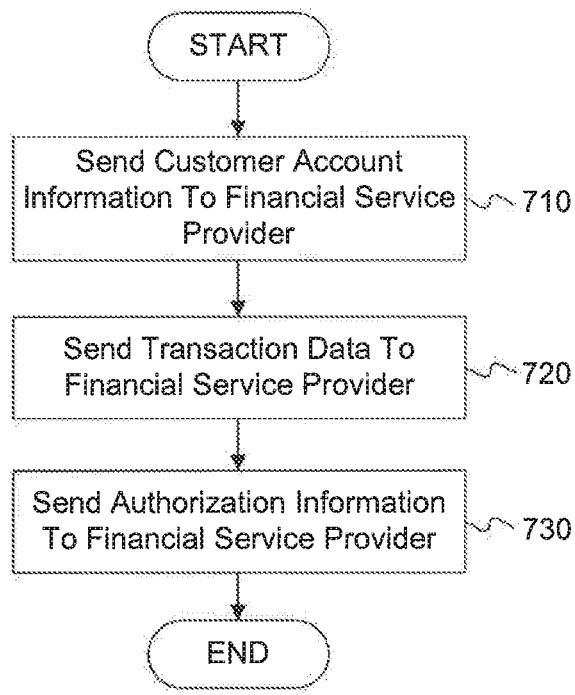
FIG. 7 depicts a flowchart of an exemplary method for sending transaction information associated with the purchase transaction to a financial service provider consistent with disclosed embodiments.

FIG. 7 depicts a flowchart of an exemplary method for sending transaction information associated with the purchase transaction to a financial service provider consistent with disclosed embodiments. In some embodiments, server 250 may send customer account information, transaction data, and/or authorization information associated with the purchase transaction to financial service provider 120. For example, in some embodiments, server 250 may send customer account information (step 710). The customer account information may include the account number of a financial service account associated with financial service provider 120. Additionally or alternatively, the customer account information may include a customer's social security number or a unique identifier associated with the financial service account. In step 720, server 250 may send all transaction data (e.g., purchase price, time and data of the transaction, product/service identification, and merchant identification) or only selected data. For example, server 250 may send only the purchase price and time and date of the transaction to financial service provider 120. Furthermore, the authorization information may include verification that the biometric data used to find the common biometric data was not fraudulently created (step 730).

Figure 8:
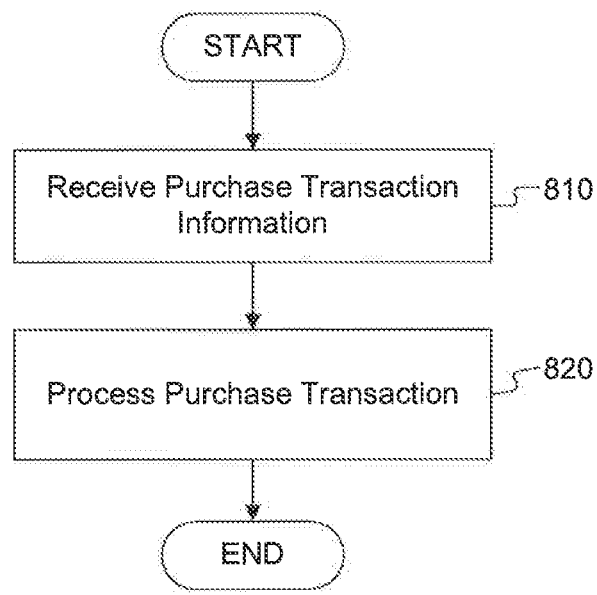
FIG. 8 depicts a flowchart of another exemplary method for processing a customer purchase transaction using biometric data consistent with disclosed embodiments.

FIG. 8 is a flow diagram 800 of an exemplary method for receiving a customer purchase transaction using biometric data, consistent with disclosed embodiments. In step 810, financial service provider 120 may receive purchase transaction information from one or more components of system 100. Such information may include, for example, customer account information, transaction data, and authorization information. In step 820, financial service provider 120 may process the purchase transaction. For example, financial service provider 120 may locate the customer account associated with the customer account information, deduct the purchase amount from the customer account, and notify the customer of this deduction. A more detailed discussion is provided below (with respect to FIG. 10) regarding sending purchase transaction information to financial service provider 120.

Figure 9:
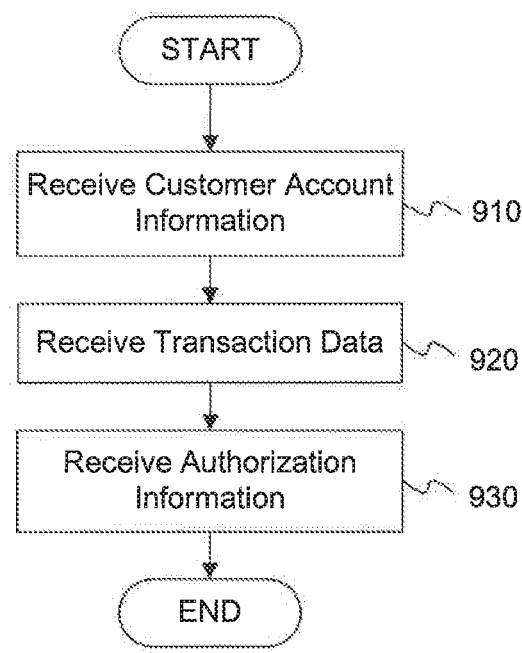
FIG. 9 depicts a flowchart of an exemplary method for receiving purchase transaction information consistent with disclosed embodiments.

FIG. 9 depicts a flowchart of an exemplary method for receiving purchase transaction information consistent with disclosed embodiments. In some embodiments, financial service provider 120 may receive purchase transaction information from processing entity 150. The purchase transaction information may reflect a purchase from customer 140 at merchant 130 using biometric data. Financial service provider, as shown in step 910, may receive customer account information associated with a financial service account provided by financial service provider 120. The account information may include the account number of a financial service account associated with financial service provider 120. Additionally or alternatively, the customer account information may include a customer's social security number or a unique identifier associated with the financial service account.

Financial service provider 120 may additionally receive transaction data associated with the purchase transaction (step 920). The transaction data may include purchase price, time and data of the transaction, product/service identification, and/or merchant identification, including any combination of this data. For example, financial service provider may receive only the purchase price and time and date of the transaction. Furthermore, as shown in step 930, financial service provider 120 may receive authorization information verifying the biometric data used to find the common biometric data was not fraudulently created.

Figure 10:
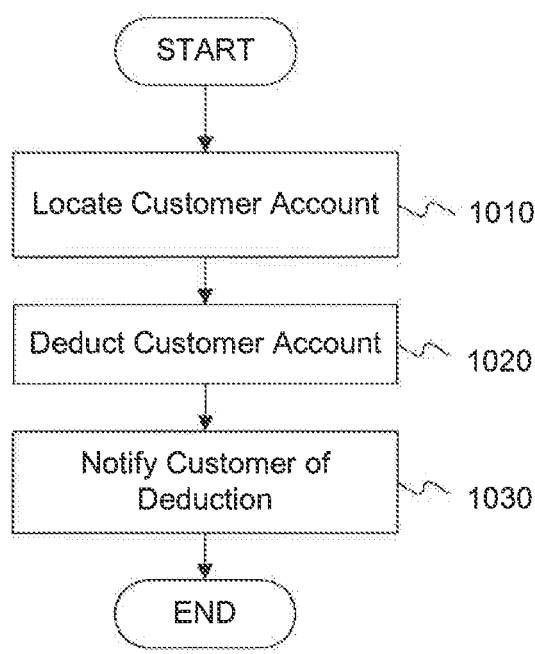
FIG. 10 depicts a flowchart of an exemplary method processing the purchase transaction consistent with disclosed embodiments.

FIG. 10 depicts a flowchart of an exemplary method processing the purchase transaction consistent with disclosed embodiments. As shown in FIG. 10, financial service provider 120 may process the purchase transaction. Financial service provider 120 may locate the customer account associated with the received customer account information (step 1010). The customer account may include a financial service account including, for example, credit card accounts, checking accounts, savings accounts, loans, investment accounts. Financial service provider 120 may additionally deduct the purchase price from the customer account, as shown in step 1020. In some embodiments, as shown in step 1030, financial service provider may further notify customer 140 of the deduction. For example, financial service provider 120 may provide a notification in the form of an electronic message or document (e.g., email, link to a website, SMS message, business software mechanisms (ERP, CRM, etc.). In some embodiments, financial service provider may provide the notification in the form of a bank statement.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

What is claimed is:

1. A system for creating a customer purchase transaction using biometric data, comprising:
   one or more processors; and
   one or more memory devices storing instructions that, when executed by the one or more processors, cause the one or more processors to perform the operations of:
   receiving biometric data of a customer, the biometric data being unique to the customer;
   receiving transaction data, the transaction data reflecting at least a price of a purchase transaction by the customer;
   identifying common biometric data associated with the customer by comparing the received biometric data to a plurality of stored biometric data associated with customers of a financial service provider, the common biometric data including a plurality of pieces representing different biometric identifications;
   determining a first confidence value for a first piece of the common biometric data based on a quality associated with the received biometric data;
   identifying a customer account associated with the financial service provider;
   verifying the identified customer account associated with the financial service provider contains adequate funds for the price of the purchase transaction; and
   providing an indication authorizing the purchase transaction based on the verification,
   wherein the operation of identifying a customer account associated with the financial service provider comprises:
   when the first confidence value meets or exceeds a confidence threshold,
      identifying a customer account associated with the financial service provider based on the first piece of common biometric data; and
   when the first confidence value does not meet or exceed the confidence threshold,
      determining a second confidence value for a second piece of the common biometric data;
      generating an aggregated confidence value by aggregating the first and second confidence values; and
      identifying a customer account when the aggregated confidence value meets or exceeds the confidence threshold.

2. The system of claim 1, wherein the one or more memory devices stores instructions that, when executed by the one or more processors, cause the one or more processors to perform further operations comprising:
   requesting a selection by the customer of at least one form of biometric identification from a plurality of biometric identifications; and
   receiving an indication that the customer has selected at least one form of biometric identification.

3. The system of claim 2, wherein the biometric identifications comprise at least one of a fingerprint scan, iris scan, facial recognition, and voice recognition.

4. The system of claim 1, wherein the one or more memory devices stores instructions that, when executed by the one or more processors, cause the one or more processors to perform further operations comprising:
   receiving authorization information provided by the customer; and
   authorizing the purchase transaction based at least on the authorization information and the verification.

5. The system of claim 1, wherein the received biometric data is obtained from the customer at a payment terminal.

6. A method for processing a customer purchase transaction using biometric data, comprising:
   receiving biometric data of a customer, the biometric data being unique to the customer;
   receiving transaction data, the transaction data reflecting at least a price of a purchase transaction by the customer;
   identifying common biometric data associated with the customer by comparing, by one or more processors, the received biometric data to a plurality of stored biometric data associated with customers of a financial service provider, the common biometric data including a plurality of pieces representing different biometric identifications;
   determining a first confidence value for a first piece of the common biometric data based on a quality associated with the received biometric data;
   identifying a customer account associated with the financial service provider;
   verifying, by the one or more processors, the identified customer account associated with the financial service provider contains adequate funds for the price of the purchase transaction; and
   providing an indication authorizing the purchase transaction based on the verification,
   wherein identifying a customer account associated with the financial service provider comprises:
   when the first confidence value meets or exceeds a confidence threshold,
      identifying a customer account associated with the financial service provider based on the first piece; and
   when the first confidence value does not meet or exceed the confidence threshold,
      determining a second confidence value for a second piece of the common biometric data;
      generating an aggregated confidence value by aggregating the first and second confidence values; and
      identifying a customer account when the aggregated confidence value meets or exceeds the confidence threshold.

7. The method of claim 6, further comprising:
   requesting a customer selection of at least one form of biometric data from a plurality of forms of biometric data; and
   receiving an indication that the customer has selected at least one form of biometric data.

8. The method of claim 7, wherein the forms of biometric data comprise at least one of a fingerprint scan, iris scan, facial recognition, and voice recognition.

9. The method of claim 6, further comprising:
receiving authorization information provided by the customer; and
authorizing the purchase transaction based at least on the authorization information and the verification.

10. The method of claim 6, wherein the confidence threshold depends on a form of the received biometric data, the form of biometric data comprising at least one of a fingerprint scan, iris scan, facial recognition, and voice recognition.

11. The method of claim 6, further comprising:
requesting a second biometric data when the confidence value does not meet the confidence threshold; and
identifying the customer account associated with the financial service provider based at least on the second biometric data.

12. The method of claim 6, wherein the received biometric data is obtained from the customer at a payment terminal.

13. A non-transitory computer-readable storage medium storing instructions that, when executed by a processor, cause the processor to perform operations comprising:
receiving biometric data of a customer, the biometric data being unique to the customer;
receiving transaction data, the transaction data reflecting at least a price of a purchase transaction by the customer;
identifying common biometric data associated with the customer by comparing the received biometric data to stored biometric data associated with customers of a financial service provider, the common biometric data including a plurality of pieces representing different biometric identifications;
determining a first confidence value for a first piece of the common biometric data based on a quality associated with the received biometric data;
identifying a customer account associated with the financial service provider;
verifying the identified customer account associated with the financial service provider contains adequate funds for the price of the purchase transaction; and
providing an indication authorizing the purchase transaction based on the verification,
wherein the operation of identifying a customer account associated with the financial service provider comprises:
when the first confidence value meets or exceeds a confidence threshold,
identifying a customer account associated with the financial service provider based on the first piece; and
when the first confidence value does not meet or exceed the confidence threshold,
determining a second confidence value for a second piece of the common biometric data;
generating an aggregated confidence value by aggregating the first and second confidence values; and
identifying a customer account when the aggregated confidence value meets or exceeds the confidence threshold.

14. The system of claim 1, wherein the confidence threshold depends on a form of biometric identification associated with the received biometric data, the form of biometric data comprising at least one of a fingerprint scan, iris scan, facial recognition, and voice recognition.

15. The system of claim 1, wherein the one or more memory devices stores instructions that, when executed by the one or more processors, cause the one or more processors to perform further operations comprising:
requesting a second biometric data when the confidence value does not meet the confidence threshold; and
identifying the customer account associated with the financial service provider based at least on the second biometric data.

16. The medium of claim 13, wherein the confidence threshold depends on a form of biometric identification associated with the received biometric data, the form of biometric data comprising at least one of a fingerprint scan, iris scan, facial recognition, and voice recognition.

17. The medium of claim 13, wherein the medium stores further instructions that, when executed by the processor, cause the one or more processor to perform further operations comprising:
requesting a second biometric data when the confidence value does not meet the confidence threshold; and
identifying the customer account associated with the financial service provider based at least on the second biometric data.

18. The system of claim 1, wherein the operation of identifying a customer account associated with the financial service provider further comprises:
when the aggregated confidence value does not meet or exceed the confidence threshold,
determining confidence values for each piece of the common biometric data;
generating a total confidence value by aggregating the confidence values; and
identifying a customer account associated with the financial service provider when the total confidence value meets or exceeds the confidence threshold.

19. The system of claim 18, wherein the operation of identifying a customer account associated with the financial service provider further comprises:
providing an indication the purchase transaction cannot be completed when the total confidence value does not meet or exceed the confidence threshold.

* * * * *